US012577990B2

(12) United States Patent
Binder et al.

(10) Patent No.: US 12,577,990 B2
(45) Date of Patent: Mar. 17, 2026

(54) ELECTROMAGNETICALLY SHIFTABLE POSITIVE ENGAGEMENT CLUTCH

(71) Applicant: Hoerbiger Antriebstechnik Holding GmbH, Schongau (DE)

(72) Inventors: Jürgen Binder, Schongau (DE); Peter Echtler, Schongau (DE); Andreas Dempfle, Schongau (DE); Werner Fuerguth, Schongau (DE); Wolfgang Voelk, Schongau (DE); Oleg Butorin, Schongau (DE); Sebastian Kucharek, Schongau (DE); Marco Lautensach, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 19/196,024

(22) Filed: May 1, 2025

(65) Prior Publication Data

US 2025/0341237 A1 Nov. 6, 2025

(30) Foreign Application Priority Data

May 3, 2024 (DE) ......................... 102024112562.4

(51) Int. Cl.

*F16D 27/108* (2006.01)
*F16D 27/118* (2006.01)
*F16D 27/14* (2006.01)

(52) U.S. Cl.

CPC .......... *F16D 27/108* (2013.01); *F16D 27/118* (2013.01); *F16D 27/14* (2013.01); *F16D 2300/18* (2013.01)

(58) Field of Classification Search

CPC . F16D 27/108; F16D 11/002; F16D 2011/004
See application file for complete search history.

(56) References Cited

U.S. PATENT DOCUMENTS 3,524,525 A * 8/1970 Gorz ....................... F16D 23/06 192/53.34
6,026,925 A * 2/2000 Nagao .................... B62D 5/043 180/444

(Continued)

FOREIGN PATENT DOCUMENTS

JP S638606 U * 1/1988

*Primary Examiner* — Stacey A Fluhart
(74) *Attorney, Agent, or Firm* — McNees Wallace & Nurick

(57) ABSTRACT

An electromagnetically shiftable positive engagement clutch is shown. The positive engagement clutch has a shifting sleeve which is arranged on a shaft for joint rotation therewith and is linearly displaceable along the shaft between a clutch engagement position and a clutch disengagement position, and at least one clutch body which is aligned coaxially with the shaft. For adjustment of the shifting sleeve along the shaft, the positive engagement clutch includes a stator having at least one energized drive coil. In the clutch engagement position there is a positive engagement between the shifting sleeve and the clutch body and thus a rotary connection between the shaft and the clutch body. In addition, the positive engagement clutch includes a differential transformer sensor having coils and an electronic module, the differential transformer sensor being configured to detect the engagement position of the shifting sleeve by means of the coils. Here, the electronic module is configured to convert the output signal of the coils into a direct current signal.

9 Claims, 2 Drawing Sheets

(56) References Cited

U.S. PATENT DOCUMENTS

| | | | | |
|---|---|---|---|---|
| 9,052,178 | B2 | 6/2015 | Grosse et al. | |
| 2010/0276245 | A1* | 11/2010 | Umeno | F16D 27/118 192/69.81 |
| 2019/0264753 | A1 | 8/2019 | Creech et al. | |
| 2020/0063806 | A1* | 2/2020 | Ekonen | F16D 27/108 |

* cited by examiner

ELECTROMAGNETICALLY SHIFTABLE POSITIVE ENGAGEMENT CLUTCH

TECHNICAL FIELD

The present disclosure relates to an electromagnetically shiftable positive engagement clutch.

BACKGROUND

The term "electromagnetically shiftable positive engagement clutch" is intended to reflect the fact that the clutch is actuated electromagnetically. When the clutch is closed, torque transmission is effected by positive engagement. Positive engagement clutches include tooth clutches and dog clutches, for example.

If a torque is to be temporarily transmitted from one shaft to another, coaxially aligned shaft without these two shafts being connected permanently, clutches are typically employed. A distinction is made here between frictionally engaging and positively engaging clutches. As already mentioned above, the present disclosure is restricted to positively engaging clutches.

For positively engaging clutches, displaceable shifting sleeves are frequently used. These include toothings that engage with mating toothings of a driven clutch body so that a positive engagement, i.e. an engagement in a form-fitting manner, is produced that allows a torque to be transmitted from one shaft to another.

Disclosed in the prior art are electromagnetic clutches in which the adjustment of the shifting sleeve takes place by means of a coil that exerts a magnetic force on the shifting sleeve. In clutches of this type, the shifting sleeve can be moved in opposite directions starting from a disengagement position in order to move the shifting sleeve into engagement with different, axially spaced apart clutch bodies.

For a best possible electronically controlled clutch operation process, it is necessary to know the exact position of the shifting sleeve at all times. For each control command transmitted to the electromagnetically shiftable positive engagement clutch, the current shifting state has to be analyzed first, so that the controller has to be able to interrogate the position of the shifting sleeve at any time.

In the prior art, the shifting state or the engagement position of the shifting sleeve is determined using indirect measurements, for example by the current status of the stator or the speed of the shafts to be connected.

As an alternative, a sensor may be integrated in a housing of the positive engagement clutch. However, this also involves an indirect measurement, which is carried out by means of an additional actuating component, such as, e.g., a disk which is coupled to a displaceable part, for example the shifting sleeve.

It is also possible to employ switches to determine the end position of the shifting sleeve, that is, an engagement position of the shifting sleeve. The switch is actuated here by a separate, dedicated actuating part mounted to the shifting sleeve when the shifting sleeve is in the engagement position.

As an alternative to a switch, a travel measuring system may also be used, which is likewise actuated through an additional component.

The methods known in the prior art for detecting the position of the shifting sleeve thus distinguish themselves in that indirect measurements are involved, which require an additional component. A direct and precise determination at the actual clutch engagement position is therefore not possible; rather, additional components are always required.

In addition, the position of the shifting sleeve is usually detected in the axial direction, which increases the installation space required for the positive engagement clutch.

Furthermore, the additionally required components and the installation space required increase the manufacturing costs of the positive engagement clutch.

Moreover, these measuring techniques often require precise calibration of the sensor in relation to the point of measurement, which is usually very elaborate and therefore cost-intensive.

It is therefore an object of the present disclosure to make it possible to directly detect the position of the shifting sleeve without the need for additional components, in order to keep the costs and the installation space required as low as possible.

SUMMARY

Example embodiments provide an electromagnetically shiftable positive engagement clutch. The positive engagement clutch includes a shifting sleeve which is arranged on a shaft for joint rotation therewith and is linearly displaceable along the shaft between a clutch engagement position and a clutch disengagement position, and at least one clutch body which is aligned coaxially with the shaft. For adjustment of the shifting sleeve along the shaft, the positive engagement clutch includes a stator having at least one energized drive coil. In the clutch engagement position there is a positive engagement between the shifting sleeve and the clutch body and thus a rotary connection between the shaft and the clutch body. In addition, the positive engagement clutch includes a differential transformer sensor having coils and an electronic module, the differential transformer sensor being configured to detect the engagement position of the shifting sleeve by means of the coils. Here, the electronic module is configured to convert the output signal of the coils into a direct current signal. In other words, a sensor based on the principle of a differential transformer is installed in the electromagnetically shiftable positive engagement clutch, so that the engagement position of the shifting sleeve can be detected directly by means of the coils of the differential transformer and without an interposition of a separate moving part, wherein the signal converted by the electronic module can be passed on to a controller which can detect and process a position of the shifting sleeve on the basis of the signal. The position of the shifting sleeve is thus detected by means of a direct measurement by the differential transformer sensor and the number of additionally required components, and thus the required installation space, can be reduced. Furthermore, a differential transformer sensor is a commonly used sensor that does not noticeably increase the cost of the positive engagement clutch.

A differential transformer sensor is an electromechanical displacement sensor, which is also referred to as a linear variable differential transformer (LVDT). Accordingly, this means it is an analog sensor for displacement sensing, the resolution of which is mainly limited by the connected electronics.

The fundamental idea of the present disclosure is therefore to use the differential transformer sensor to directly determine the engagement position of the shifting sleeve and to avoid additional components.

According to one example embodiment, the coils of the differential transformer sensor comprise a primary coil and two secondary coils, between which the primary coil is positioned. The differential transformer sensor therefore comprises only three coils, so that the costs can be kept low. For example, the secondary coils each have the same distance from the primary coil to avoid an offset and are connected in series in phase opposition.

Differential transformer sensors typically also comprise an armature. In the positive engagement clutch, this armature is provided by the shifting sleeve, which is made of a magnetically soft material.

Alternatively, if the shifting sleeve is displaced indirectly by means of an armature, the armature consists of a magnetically soft material and serves as an armature for the differential transformer sensor.

For detecting the position of the shifting sleeve, the primary coil of the differential transformer is supplied with a constant alternating current. In the clutch disengagement position, the shifting sleeve is located centrally between the two secondary coils so that no signal is output by the differential transformer sensor.

But when the shifting sleeve is displaced, a current is induced in the secondary coils on the basis of the position of the shifting sleeve, and an output voltage can be measured between the two secondary coils. The phase of the induced voltage here depends on the direction of movement of the shifting sleeve, while the amplitude changes as a function of the displacement of the shifting sleeve.

Since the output signal of the secondary coils is also an alternating current signal due to the alternating current excitation signal, the signal is converted by the electronic module into a direct current signal, which can be further processed.

As already mentioned, according to one example embodiment, the shifting sleeve may also be adjusted indirectly by an armature. In this case, the position of the armature can be detected by the differential transformer sensor, with the position of the armature indicating the position of the shifting sleeve.

According to a preferred example embodiment, the coils are planar coils arranged on a coil circuit board. By using planar coils, the installation space required can be significantly reduced since only a circuit board needs to be installed in the positive engagement clutch. When planar coils are used, the primary coil is a rectangular coil. The secondary coils are arranged within the rectangular primary coil and have a sine or cosine geometry. In this case too, a current is induced in the secondary coils when the shifting sleeve is displaced from the clutch disengagement position.

The electronic module may be arranged on a separate electronic circuit board or also on the coil circuit board. The options of using a separate electronic circuit board or alternatively arranging the electronic module on the coil circuit board result in more options for positioning the differential transformer sensor in the positive engagement clutch. The exact design of the differential transformer sensor therefore depends on the available installation space within the positive engagement clutch. The arrangement of the differential transformer sensor is thus flexible thanks to the possible division into a coil circuit board and an electronic circuit board.

According to one example embodiment, the electronic module is arranged on the separate electronic circuit board, with the coil circuit board being arranged between the at least one drive coil and the shifting sleeve while the electronic circuit board is arranged radially outside the at least one drive coil. Accordingly, a spatial separation between the coil circuit board and the electronic circuit board is obtained, as a result of which the installation space required between the shifting sleeve and the drive coil for installing the differential transformer sensor may be smaller.

The coil circuit board and the electronic circuit board may be connected to each other by means of a cable which runs laterally past the drive coil. This further allows the output signal from the electronic module to be converted into a direct current signal and passed on. Owing to the lateral routing of the cable, it can also be ensured that the structure of the positive engagement clutch per se does not need to be modified, so that repair or retrofitting are also possible without any problems.

As an alternative to a cable that connects the two circuit boards to each other, a 3D circuit board may also be used. This involves a rigid-flex printed circuit card in the connection of which the required lines are comprised.

According to one example embodiment, the positive engagement clutch comprises two differential transformer sensors which are arranged offset from each other in the circumferential direction. Since each sensor can only detect the position of the shifting sleeve at the point of measurement assigned to the sensor, a differential transformer sensor cannot be used for detecting a tilting of the shifting sleeve. By using two differential transformer sensors, however, it can be determined whether the shifting sleeve is tilted due to the fit clearance and/or the force of gravity, so that a falsified measuring result can be prevented. In addition, any potential misalignment, i.e. possible tilting, of the shifting sleeve can be rectified as quickly as possible.

For example, the two differential transformer sensors are offset from each other at an angle of 180 degrees. Particularly in the event of a tilting, the maximum difference between the positions of the shifting sleeve can be determined here.

The differential transformer sensor may be arranged in a sensor housing, wherein the sensor housing may be fastened in a transmission housing or to the stator, for example to a stator housing. The fastening location selected for the sensor housing depends on the configuration of the positive engagement clutch and may be selected depending on the available installation space, as long as the differential transformer sensor is arranged radially on the outside along the circumference of the shifting sleeve.

What is important here is that the differential transformer sensor can be contacted by means of a cable and/or a plug in order to supply the primary coil with an alternating current and to transmit the output signal of the secondary coils after conversion by the electronic module.

According to one example embodiment, the electromagnetically shiftable positive engagement clutch is connected to a controller, which is connected for example to the electronic module of the differential transformer sensor in terms of signaling. The electronic module here is configured to pass the position of the shifting sleeve as detected by the coil arrangement on to the controller by means of the converted direct current signal. The controller, for its part, is configured to control a clutch engagement process based on the position of the shifting sleeve. In this way, it can be ensured that the clutch engagement process proceeds as smoothly as possible and that any faults are corrected as quickly as possible, for example in the event of a tilting of the coil.

DETAILED DESCRIPTION

Figure 1:
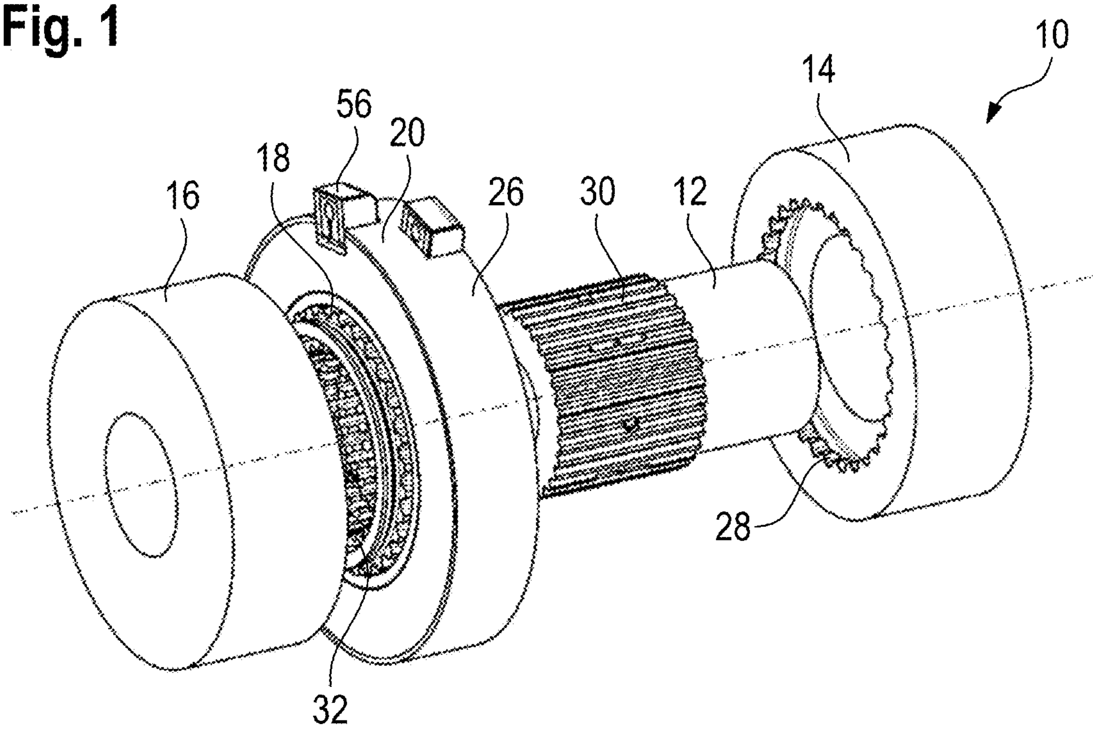
FIG. 1 shows an exploded view of an electromagnetically shiftable positive engagement clutch according to a first example embodiment of the disclosure.

FIG. 1 shows an electromagnetically shiftable positive engagement clutch 10. The positive engagement clutch 10 shown here is an electromagnetic tooth clutch having teeth projecting radially inward and radially outward and engaging with each other.

In general, a positive engagement clutch 10 is understood to refer to a clutch in which an engagement position is held by means of a positive engagement, that is, normally by means of toothings.

The positive engagement clutch 10 comprises a shaft 12, a first clutch body 14, a second clutch body 16 and, between them, a shifting sleeve 18 and a stator 20.

Figure 2:
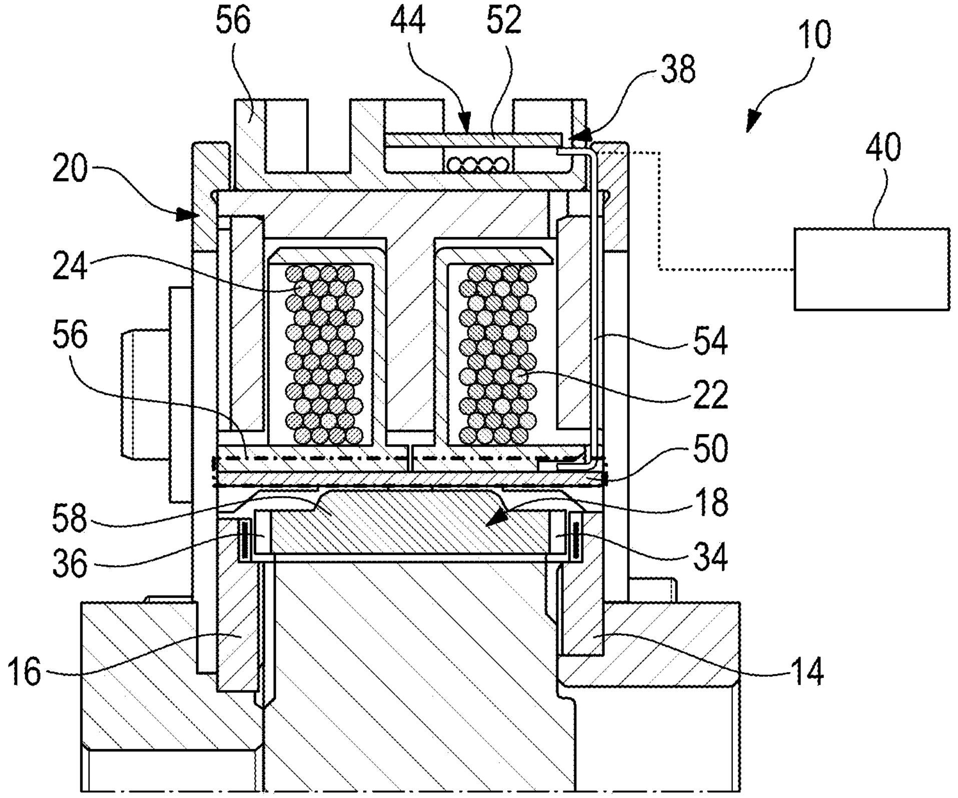
FIG. 2 shows a detailed sectional representation of the stator and the shifting sleeve of the positive engagement clutch according to a second example embodiment.

Accommodated in the stator 20 are a first energizable drive coil 22 and, next to it, a second energizable drive coil 24, which can be seen in FIG. 2. Furthermore, the stator 20 comprises a stator housing 26 made of steel which, together with the drive coils 22, 24, forms an electromagnet.

A shifting force can be brought about by energizing the drive coils 22, 24.

The clutch bodies 14, 16 are axially spaced apart and each aligned coaxially with the shaft 12. This can be clearly seen from the illustration in FIG. 1.

Each clutch body 14, 16 includes an internal toothing 28.

The shifting sleeve 18 is arranged on the shaft 12 for joint rotation therewith and is linearly displaceable along the shaft 12 between a first clutch engagement position, a second clutch engagement position and a clutch disengagement position, also referred to as neutral position, located between the clutch engagement positions. The various engagement positions will be discussed in more detail below.

In the exemplary embodiment, the shifting sleeve 18 is displaced directly, i.e. the shifting sleeve 18 can be displaced axially by energization of the drive coils 22, 24, in that the magnetic field generated by a drive coil 22, 24 exerts a force on the shifting sleeve 18.

Accordingly, the shifting sleeve 18 is produced from a magnetically soft metal.

It is, however, also conceivable that the shifting sleeve 18 can be displaced indirectly by means of an armature. In this case, the shifting sleeve 18 may be formed of any desired material, while the armature coupled to it has to be made of a magnetically soft material in order to be able to be displaced by the magnetic field generated by the drive coils 22, 24.

It is also conceivable that the stator 20 includes only one drive coil 22, 24, in which case the shifting sleeve 18 can only be displaced between a clutch engagement position and a clutch disengagement position. That is, the positive engagement clutch 10 comprises only one clutch body 14, 16.

In the embodiment shown in FIG. 1, the shaft 12 has an external toothing 30 between the clutch bodies 14, 16, which is in permanent engagement with an internal toothing 32 of the shifting sleeve 18.

At its opposite face-side ends, the shifting sleeve 18 has a respective first toothing 34 and a second toothing 36, which are each formed as an external toothing. These are used for torque-transmitting engagement with the internal toothings 28 of the clutch bodies 14, 16 in order to transmit a torque between the shifting sleeve 18 and the clutch bodies 14, 16 when the shifting sleeve 18 is in a clutch engagement position.

The first toothing 34 and the second toothing 36 are, for example, annular toothings having teeth oriented radially inwards and radially outwards.

As an alternative to the embodiment of the positive engagement clutch 10 shown in FIG. 1, the two clutch bodies 14, 16 may also have an external toothing, with the external toothing engaging with an internal toothing of the shifting sleeve 18, as can be seen in FIG. 2.

Here, the function of the positive engagement clutch 10 does not change.

The difference is only that the shifting sleeve 18 includes an internal toothing which also serves for torque-transmitting engagement with the external toothing of one of the two clutch bodies 14, 16.

In this embodiment of the positive engagement clutch 10 as well, the toothings may be in the form of a circumferential ring toothing and/or include undercuts in the direction of the clutch engagement position.

As can be seen for example in the embodiment shown in FIG. 2, the positive engagement clutch 10 furthermore comprises a differential transformer sensor 38.

For example, the differential transformer sensor 38 is a linear variable differential transformer (LVDT), which is an analog, electromechanical displacement sensor.

The differential transformer sensor 38 can be used to detect the engagement position of the shifting sleeve 18 and pass it on to a controller 40, which can control an engagement process based on the engagement position of the shifting sleeve 18.

The differential transformer sensor 38 comprises coils 42 for detecting the position of the shifting sleeve 18 and an electronic module 44 which is coupled to the controller 40 in terms of signaling and converts the output signal of the coils 42 into a direct current signal and passes it on to the controller 40.

Figure 3:
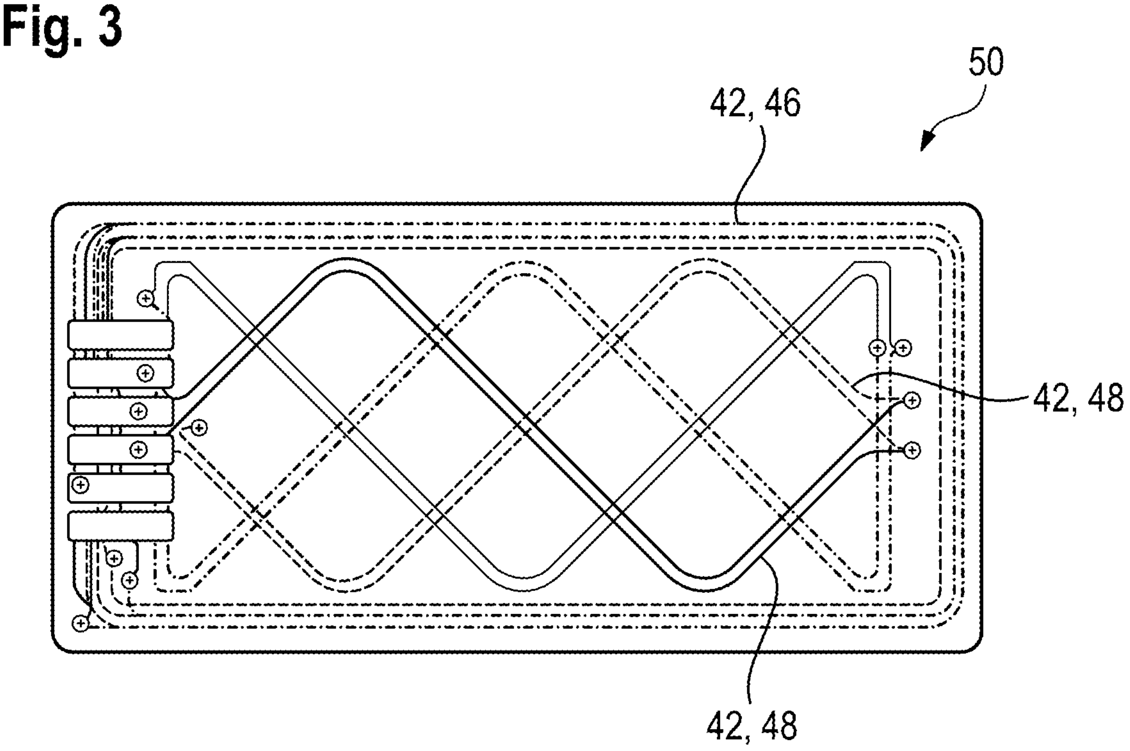
FIG. 3 shows a schematic illustration of a coil circuit board utilized in the present disclosure.

For example, as can be seen in FIG. 3, the differential transformer sensor 38 includes a primary coil 46 and two secondary coils 48.

In order to keep the differential transformer sensor 38 as small as possible such that only a minimum of installation space is required, the coils 42 are for example planar coils which are arranged on a coil circuit board 50, which is shown in FIG. 3.

FIG. 3 shows an example of such a coil circuit board 50. It can be seen here that the primary coil 46 corresponds to an outer rectangular coil, while the secondary coils 48 are arranged within this outer rectangular primary coil 46. Here, the secondary coils 48 have a sine or cosine geometry.

The secondary coils 48 are connected in series in phase opposition.

In the embodiment shown in the Figures, the electronic module 44 is arranged on a separate electronic circuit board 52.

Alternatively, however, the electronic module 44 may also be arranged on the coil circuit board 50.

As can be seen in FIG. 2 for example, the coil circuit board 50 is arranged radially between the shifting sleeve 18 and the drive coils 22, 24, whereas the electronic circuit board 52 is positioned radially outside the drive coils 22, 24.

To connect the coil circuit board 50 and the electronic circuit board 52 to each other, a cable 54 extends laterally past one of the drive coils 22, 24.

Owing to the division of the differential transformer sensor 38 into a coil circuit board 50 and an electronic circuit board 52, the differential transformer sensor 38 can be installed in the positive engagement clutch 10 in the most space-saving manner possible. In addition, this results in more options for arrangement than if the electronic module 44 is likewise arranged on a coil circuit board 50, which has to be correspondingly larger.

The differential transformer sensor 38 is arranged within a sensor housing 56 in order to protect the electronic module 44 and the coils 42.

Depending on the embodiment of the differential transformer sensor 38, there may also be two sensor housings 56, i.e. one housing for the coil circuit board 50 and one housing for the electronic circuit board.

Alternatively, the differential transformer sensor 38 may also be formed by 3D circuit boards, which are connected to each other via electrical lines as well as signal lines.

The differential transformer sensor 38 is for example firmly attached to the stator 20. This means that the differential transformer sensor 38 does not move even during an engagement process.

Alternatively, the differential transformer sensor 38 may also be fastened inside a transmission housing (not shown) of the positive engagement clutch 10.

In order to be able to determine a position by means of the differential transformer sensor 38, an armature is required that is movable relative to the coils 42. In the positive engagement clutch 10, the shifting sleeve 18 itself serves as the armature 58 for the differential transformer sensor 38, which is why the shifting sleeve 18 is for example made of a magnetically soft material.

For a measurement using the differential transformer sensor 38, an alternating voltage is applied to the primary coil 46. When the armature 58, in this case the shifting sleeve 18, is displaced, a current is induced in the secondary coils 48, resulting in the electronic module 44 receiving an output signal.

Since an alternating current is applied to the primary coil 46, the output signal of the secondary coils 48 also is an alternating current signal, which first has to be converted into a direct current signal by the electronic module 44 to be able to be processed by the controller 40.

The output signal of the secondary coils 48 is dependent on the direction of the displacement and the clutch control travel, so that the exact position of the shifting sleeve 18 can be determined based on the output signal.

For example, the direction of the displacement specifies the phase and the clutch control travel specifies the amplitude of the output signal.

An engagement process of the positive engagement clutch 10 will be described below.

FIG. 2 shows the positive engagement clutch 10 in a neutral position, in which the shifting sleeve 18 is in the disengagement position. The positive engagement clutch 10 shown in the exemplary embodiment is referred to as a "normally open" clutch.

In the disengagement position, the shifting sleeve 18 is located centrally between the two drive coils 22, 24, as can be seen in FIG. 2.

Similarly, the shifting sleeve 18 is located centrally below the coil circuit board 50 and thus centrally with respect to the secondary coils 48 of the differential transformer sensor 38. Therefore, even when the primary coil 46 is energized, no output signal is generated in the two secondary coils 48.

When the positive engagement clutch 10 is shifted, for example by energizing the first drive coil 22, a magnetic force is exerted on the shifting sleeve 18, which as a result is displaced, for example toward the first clutch body 14.

When the second drive coil 24 is energized instead of the first drive coil 22, a magnetic force is also exerted on the shifting sleeve 18. However, as a result, the shifting sleeve 18 will then shift toward the second clutch body 16 rather than toward the first clutch body 14.

Due to the displacement of the shifting sleeve 18, the first toothing 34 of the shifting sleeve 18 comes into engagement with the internal toothing 28 of the first clutch body 14.

When the shifting sleeve 18 is displaced, initially the condition may occur in which the shifting sleeve 18 abuts by its first toothing 34 against a face side of the first clutch body 14 until the alignment of the internal toothing 28 of the first clutch body 14 and the first toothing 34 of the shifting sleeve 18 allow an engagement and the shifting sleeve 18 is moved into engagement with the internal toothing 28 of the first clutch body 14.

As soon as the shifting sleeve 18 comes into overlap with the first clutch body 14, the shifting sleeve 18 is pulled further toward the first clutch body 14 due to the shape of the internal toothing 28 of the first clutch body 14 and the first toothing 34 of the shifting sleeve 18 until the shifting sleeve 18 abuts against the first clutch body 14.

Specifically, this can be achieved in that the internal toothing 28 of the clutch bodies 14, 16 and the first toothing 34 of the shifting sleeve 18 include undercuts in the direction towards the clutch engagement position, which are configured such that a torque transmission between the shaft 12 or the shifting sleeve 18 and a clutch body 14, 16 generates a force on the shifting sleeve 18 in the direction of the clutch engagement position.

The clutch control travel of the shifting sleeve 18 is limited in the direction of the clutch engagement position by the shifting sleeve 18 abutting against the first clutch body 14.

As mentioned above, the shifting sleeve 18 serves as a magnetically conductive armature 58 for the differential transformer sensor 38.

By energizing one of the drive coils 22, 24 and the resulting displacement of the shifting sleeve 18, an alternating current is induced in the secondary coils 48.

The alternating current signal is converted into a direct current signal by the electronic module 44 and passed on to the controller 40.

For the transmission of the direct current signal, the electronic module 44 is therefore coupled to the controller 40 in terms of signaling.

Based on the phase and the amplitude of the output signal, the exact engagement position of the shifting sleeve 18 can be determined. Here, the phase depends on the direction of movement and the amplitude depends on the extent of the displacement.

To open the positive engagement clutch 10, the shifting sleeve 18 is moved in a disengagement direction again by energizing the second drive coil 24, for example until a respective signal is output by the differential transformer sensor 38, which has verified this position.

A current is induced in the secondary coils 48 also by this movement of the shifting sleeve 18 in the opposite direction; however, upon a displacement from the first clutch engagement position to the clutch disengagement position, the phase of the output signal does not change, but the amplitude decreases.

In order to move the shifting sleeve 18 back to the clutch disengagement position, the energization of the drive coil 24 is discontinued so that both drive coils 22, 24 are in a de-energized state and the shifting sleeve 18 can return to its initial position.

For this restoring of the shifting sleeve 18, spring elements (not shown), for example wave springs, may be provided, which are preloaded toward the clutch disengagement position.

If such a spring element is provided, the magnetic force applied by the drive coil(s) 22, 24 has to be greater than the spring force in order for the shifting sleeve 18 to be displaced toward one of the clutch engagement positions.

By energizing the second drive coil 24, the shifting sleeve 18 can be brought into engagement with the second clutch body 16 in the same way, since the shifting sleeve 18 is deflected in the opposite direction by energizing the respective other drive coil 22, 24.

In addition to the direct displacement of the shifting sleeve 18 as described above, the shifting sleeve 18 may also be displaced indirectly. In the case of indirect displacement of the shifting sleeve 18 by means of an armature, the armature is shaped from a magnetically soft metal and serves as a magnetically conductive armature 58 for the differential transformer sensor 38.

Figure 4:
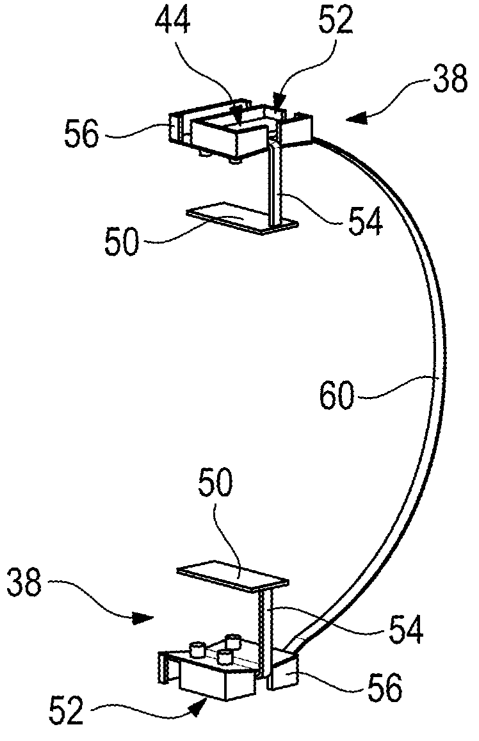
FIG. 4 shows a perspective illustration of two differential transformer sensors connected to each other.

As schematically indicated in the embodiment shown in FIG. 4, the positive engagement clutch 10 may also comprise two differential transformer sensors 38.

The two differential transformer sensors 38 here are arranged offset in relation to each other in the circumferential direction of the shifting sleeve 18, that is, they are located at different points of the shifting sleeve 18.

For example, the two differential transformer sensors 38 are placed offset from each other at an angle of 180 degrees in the circumferential direction.

The two differential transformer sensors 38 may be connected to each other by means of a cable 60, so that the differential transformer sensors 38 are coupled to each other, for example in terms of signaling.

This allows, optionally, only one electronic module 44 to be used for both differential transformer sensors 38, or each sensor 38 has its own electronic module, as shown in FIG. 4 by means of the two electronic circuit boards 52 and their sensor housings 56 surrounding them. The sensor housing 56 is mounted in or to the stator housing 26, as can be seen in FIG. 1.

As an alternative, each of the differential transformer sensors 38 may also be separately connected to the controller 40 in terms of signaling, so that the respective electronic module 44 can transmit the converted direct current signal of the coils 42 to the controller 40.

Using two differential transformer sensors 38 also allows any tilting or canting of the shifting sleeve 18 to be detected by means of the coils 42 in addition to the engagement position of the shifting sleeve 18, since the differential transformer sensors 38 detect different positions of the shifting sleeve 18.

Therefore, an appropriate signal can be output immediately by the controller 40 to compensate the tilting position of the shifting sleeve 18 in order to ensure optimum engagement behavior of the positive engagement clutch 10.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electromagnetically shiftable positive engagement clutch, comprising a shifting sleeve which is arranged on a shaft for joint rotation therewith and is linearly displaceable along the shaft between a clutch engagement position and a clutch disengagement position;

at least one clutch body which is aligned coaxially with the shaft;

a stator having at least one energizable drive coil for adjusting the shifting sleeve along the shaft, wherein in the clutch engagement position there is a positive engagement between the shifting sleeve and the clutch body and thus a rotary connection between the shaft and the clutch body; and a differential transformer sensor having coils and an electronic module, wherein the differential transformer sensor is configured to detect the engagement position of the shifting sleeve by the coils, and wherein the electronic module is configured to convert the output signal of the coils into a direct current signal, wherein the coils include a primary coil and two secondary coils.

2. The electromagnetically shiftable positive engagement clutch according to claim 1, wherein the electromagnetic clutch comprises two differential transformer sensors which are arranged offset from each other in the circumferential direction.

3. The electromagnetically shiftable positive engagement clutch according to claim 2, wherein the two differential transformer sensors are offset from each other at an angle of 180 degrees.

4. The electromagnetically shiftable positive engagement clutch according to claim 1, wherein the differential transformer sensor is arranged in a sensor housing, the sensor housing being fastened in a transmission housing or to the stator.

5. An electromagnetically shiftable positive engagement clutch, comprising a shifting sleeve which is arranged on a shaft for joint rotation therewith and is linearly displaceable along the shaft between a clutch engagement position and a clutch disengagement position;

at least one clutch body which is aligned coaxially with the shaft;

a stator having at least one energizable drive coil for adjusting the shifting sleeve along the shaft, wherein in the clutch engagement position there is a positive engagement between the shifting sleeve and the clutch body and thus a rotary connection between the shaft and the clutch body; and a differential transformer sensor having coils and an electronic module, wherein the differential transformer sensor is configured to detect the engagement position of the shifting sleeve by the coils, and wherein the electronic module is configured to convert the output signal of the coils into a direct current signal, wherein the coils are planar coils arranged on a coil circuit board.

6. The electromagnetically shiftable positive engagement clutch according to claim 3, wherein the electronic module is arranged on at least one of a separate electronic circuit board or on the coil circuit board.

7. The electromagnetically shiftable positive engagement clutch according to claim 6, wherein the electronic module is arranged on a separate electronic circuit board and the coil circuit board is arranged between the at least one drive coil and the shifting sleeve and the electronic circuit board is arranged radially outside the at least one drive coil.

8. The electromagnetically shiftable positive engagement clutch according to claim 6, wherein the coil circuit board and the electronic circuit board are connected to each other by means of a cable, the cable running laterally past the drive coil.

9. An electromagnetically shiftable positive engagement clutch, comprising a shifting sleeve which is arranged on a shaft for joint rotation therewith and is linearly displaceable along the shaft between a clutch engagement position and a clutch disengagement position;

at least one clutch body which is aligned coaxially with the shaft;

a stator having at least one energizable drive coil for adjusting the shifting sleeve along the shaft, wherein in the clutch engagement position there is a positive engagement between the shifting sleeve and the clutch body and thus a rotary connection between the shaft and the clutch body; and a differential transformer sensor having coils and an electronic module, wherein the differential transformer sensor is configured to detect the engagement position of the shifting sleeve by the coils, and wherein the electronic module is configured to convert the output signal of the coils into a direct current signal, wherein the electromagnetically shiftable positive engagement clutch is connected to a controller which is connected to the electronic module of the differential transformer sensor in terms of signaling, wherein the electronic module is configured to pass the position of the shifting sleeve as detected by the coils on to the controller by means of the converted direct current signal, and wherein the controller is configured to control a clutch engagement process based on the position of the shifting sleeve.

* * * * *